United States Patent [19]

Kopylov

[11] Patent Number: 4,706,907

[45] Date of Patent: Nov. 17, 1987

[54] AIRCRAFT

[76] Inventor: Eduard Kopylov, 2335 S. Dawson Way, Aurora, Colo. 80014

[21] Appl. No.: 696,165

[22] Filed: Jan. 29, 1985

[51] Int. Cl.[4] .............................................. B64C 3/56
[52] U.S. Cl. ..................................... 244/49; 244/218; 244/119
[58] Field of Search ....................... 244/2, 46, 49, 218, 244/DIG. 1, 117 R, 119

[56] References Cited

U.S. PATENT DOCUMENTS

| 1,859,306 | 5/1932 | Loening | 244/87 |
| 2,056,188 | 10/1936 | Hayden | 244/218 |
| 2,472,156 | 6/1949 | Gerber | 244/129.4 |
| 2,738,146 | 3/1956 | Medvedeff | 244/49 |
| 3,666,210 | 5/1972 | Look et al. | 244/218 |
| 4,415,133 | 11/1983 | Phillips | 244/45 R |

FOREIGN PATENT DOCUMENTS 330809 10/1935 Italy ...................................... 244/49

Primary Examiner—Joseph F. Peters, Jr.
Assistant Examiner—Rodney Corl

[57] ABSTRACT

An aircraft has a geometrically transformable pilot compartment, and further parts including a fuselage boom, wings and tail, wherein at least one of these parts are movable between an unfolded position in which it is ready for flying and a folded position in which it is accommodated in the pilot compartment.

5 Claims, 18 Drawing Figures

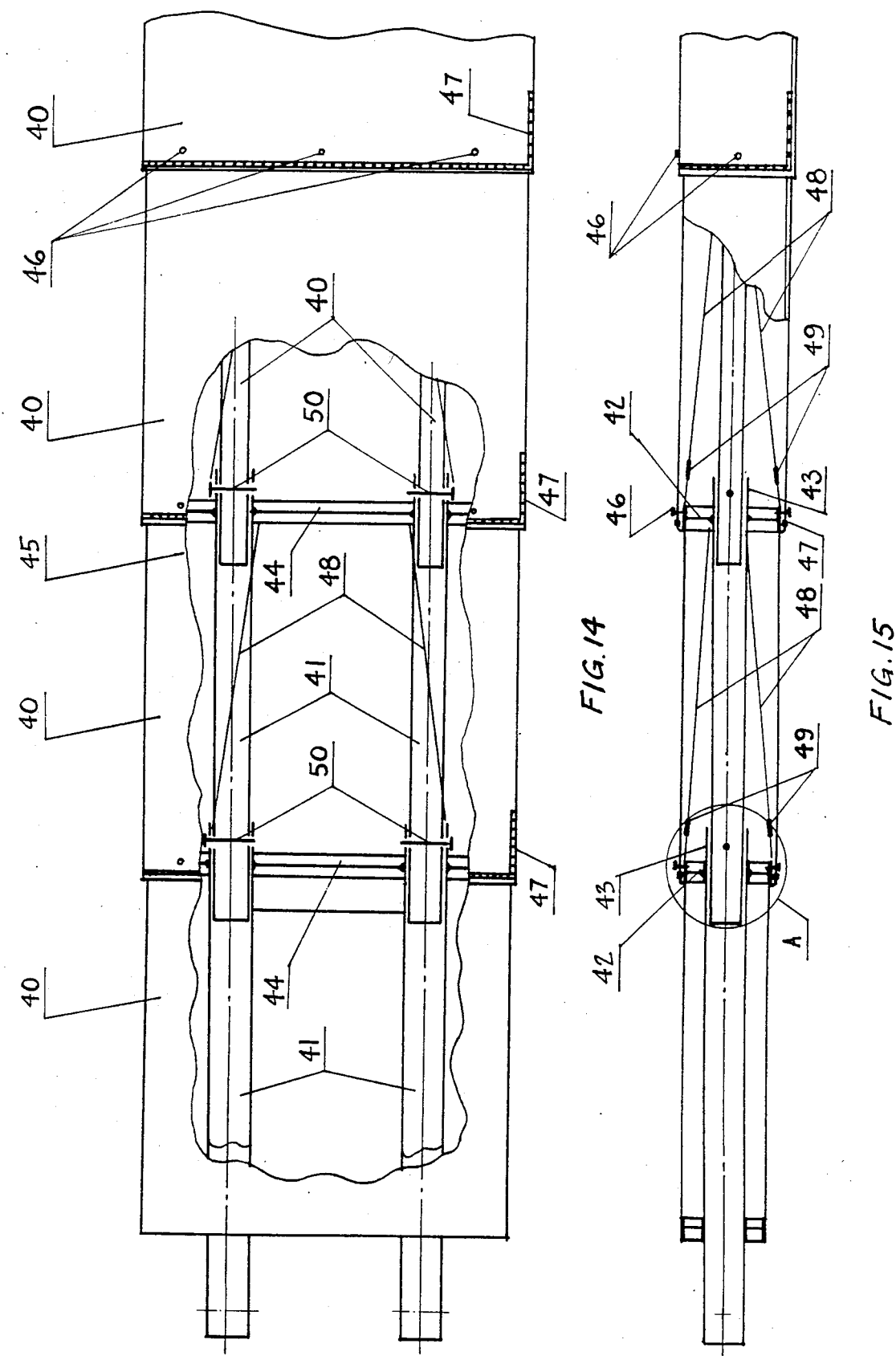

DETAIL "A" OF FIG. 15

AIRCRAFT

BACKGROUND OF THE INVENTION

The present invention deals with an aircraft.

Aircrafts are widely known and used in many fields of modern life. One of serious limitations of the use of aircrafts, especially by individuals or small companies, is that the existing aircrafts are not sufficiently portable. They cannot be transported in land vehicles in folded condition so that they occupy only a very small space. As a rule, for transportation purposes with the aid of land vehicles of a small capacity and size, the existing aircrafts must be disassembled, transported in the disassemled condition and then again assembled at the point of destination. It is to be understood that there is a real demand of having a portable, easily foldable and unfoldable aircraft, occupying a small space in the folded condition.

SUMMARY OF THE INVENTION

Accordingly, it is an object of the present invention to provide an aircraft which is portable for the purpose of easy and convenient transportation.

In keeping with these objects and with others which will become apparent hereinafter, one feature of the present invention resides, briefly stated in an aircraft which has means forming a pilot compartment, and also a fuselage boom, wings, tail parts, wherein at least one of the latter mentioned elements is movable between a folded position in which it is undetachably folded and accommodated in the pilot compartment, and unfolded position in which it is undetachably unfolded and is ready for flying.

In accordance with a preferred embodiment, all these mentioned elements are movable between these two positions.

The novel features of the invention are set forth in particular in the appended claims. The invention itself however will be best understood from the following description and drawings.

BRIEF DESCRIPTION OF THE DRAWINGS

FIGS. 14 and 15 are a plan view and a front view of a wing in the unfolded position;

DESCRIPTION OF PREFERRED EMBODIMENTS

Figure 1:
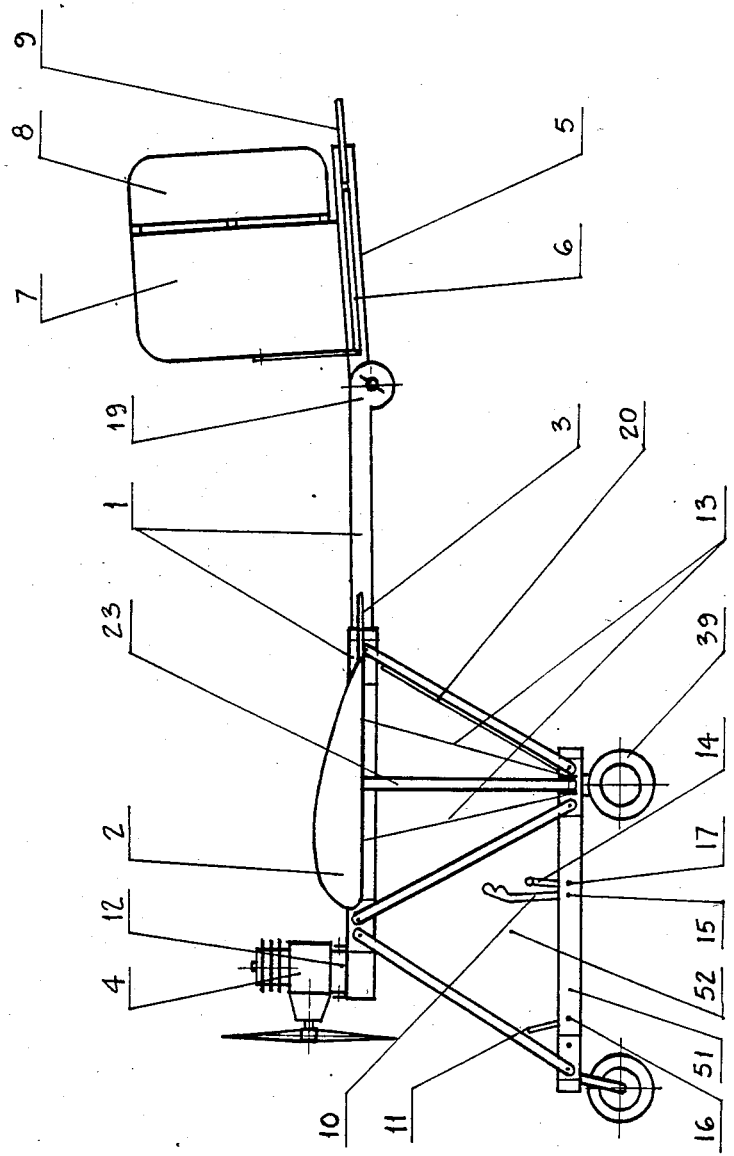
FIG. 1 is a side view of an inventive aircraft in unfolded position, ready to fly.
Figure 2:
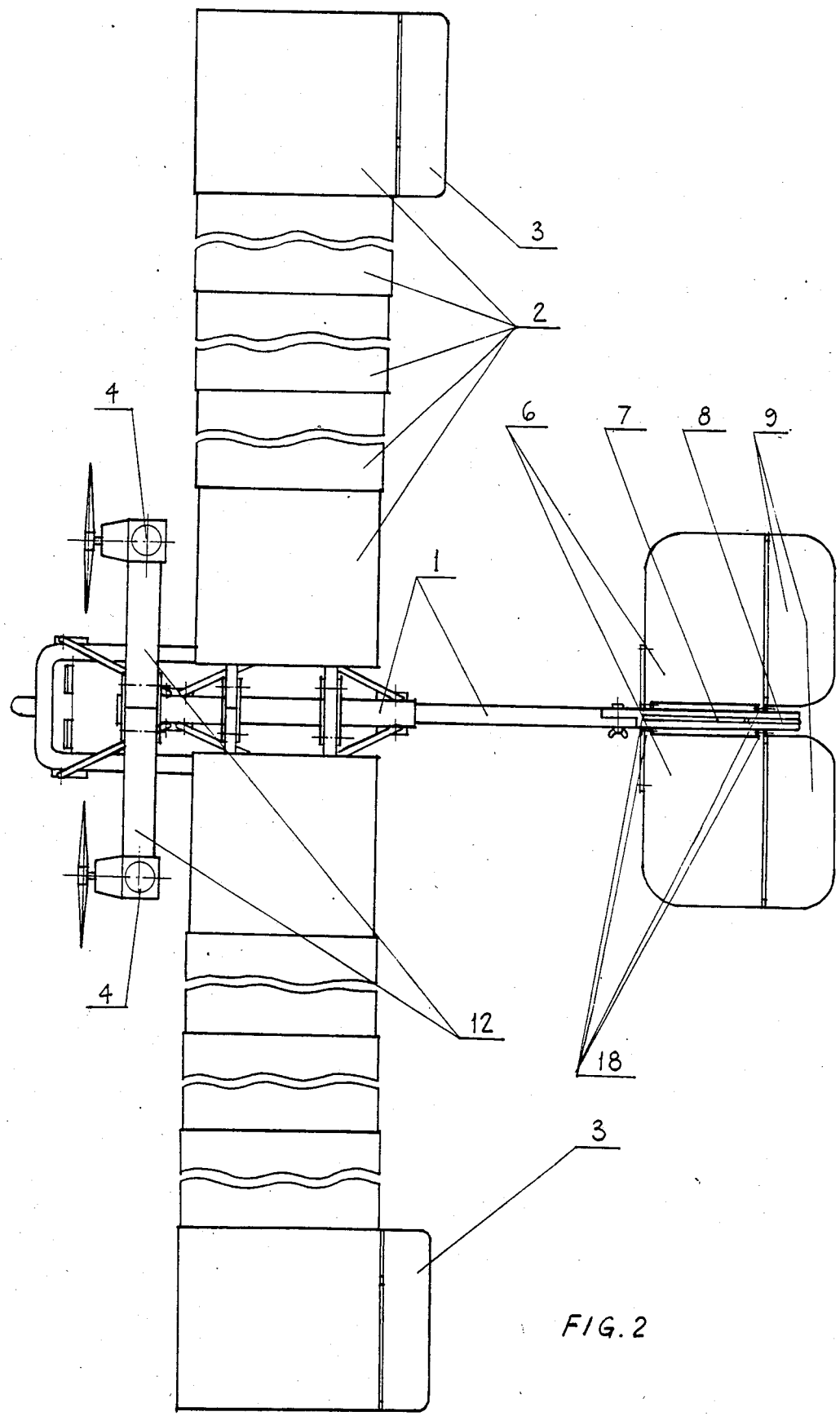
FIG. 2 is a plan view of the inventive aircraft of FIG. 1 in the unfolded position.
Figure 3:
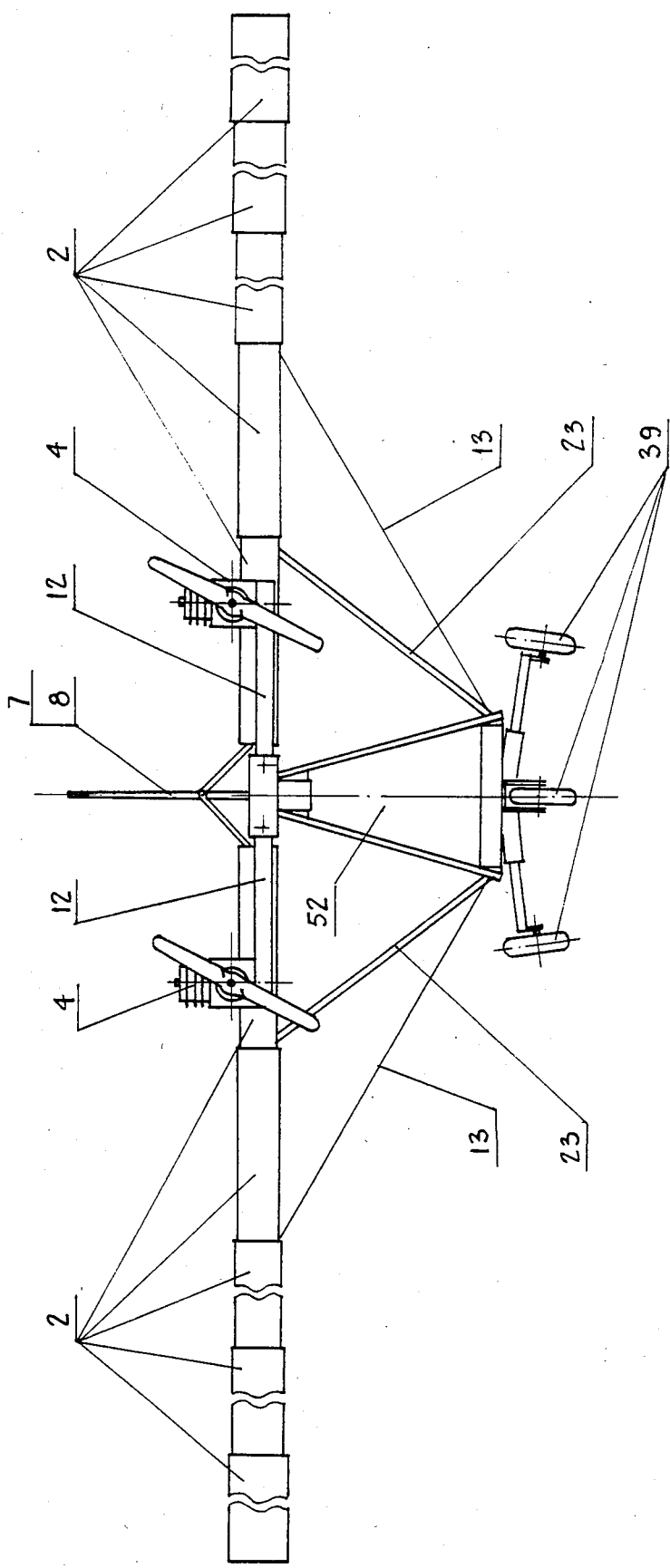
FIG. 3 is a front view of the aircraft of FIGS. 1 and 2 in the same unfolded position.
Figure 4:
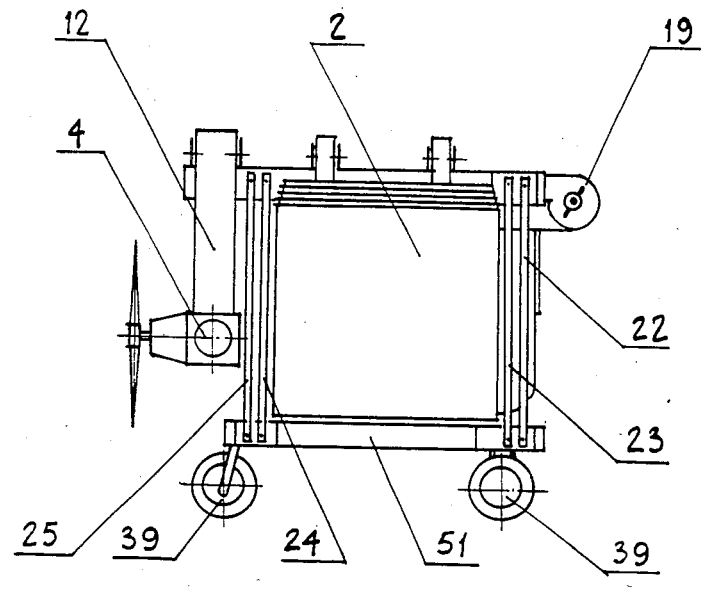
FIG. 4 is a side view of the inventive aircraft in a folded position.
Figure 5:
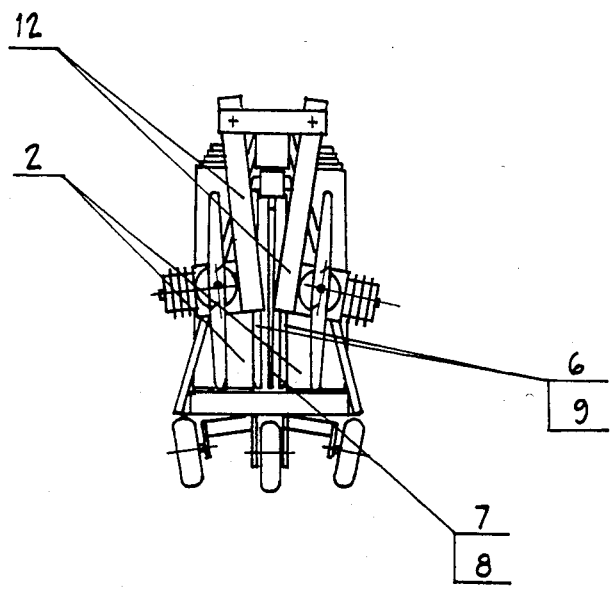
FIG. 5 is a front view of the inventive aircraft in the folded position.

An aircraft in accordance with the present invention as examplified by an airplane (FIGS. 1-5) has a fuselage boom 1, wings 2 with ailerons 3, engines 4, a tail part 5 having stabilizers 6 with a fin 7, a rudder 8 and elevators 9, means forming a pilot compartment 52 with a pilot seat 20, a control stick 10, rudder pedals 11, an engine accelerator lever 14, wheels 39. An aircraft control system is conventional and therefore not shown in the drawings.

The wings 2 are mounted on the fuselage boom 1 and supported by beams 23 and cables 13. The engines 4 are mounted on a console 12 installed on the fuselage boom 1.

The control stick 10, the rudder pedals 11 and the engine accelerator control lever 14 are foldable by turning about horizontal transverse hinges 15,16 and 17 respectively, so as to assume a substantially horizontal position close to a floor frame 51 of the pilot compartment 52.

Figure 6:
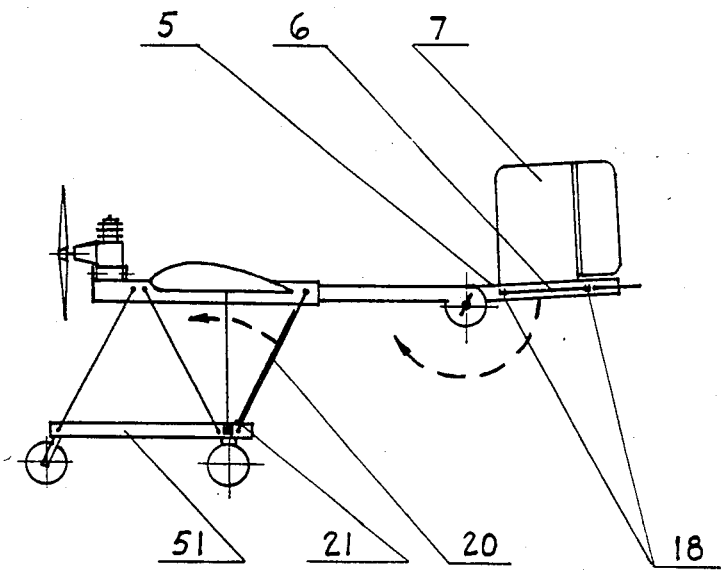
FIGS. 6 and 7 show step 1 of a folding process in a side view and a front view.
Figure 7:
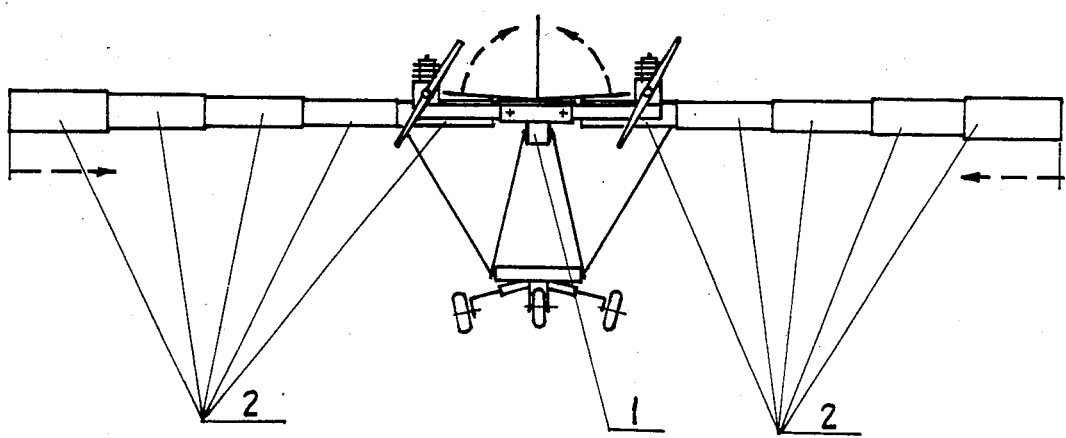

During a first step (FIGS. 6, 7) of folding of the inventive aircraft, the stabilizers 6 are turned about their horizontal longitudinal hinges 18 upwardly so as to assume a vertical position and surround the fin 7 with the rudder 8. Then the thus folded tail part 5 is turned as a whole downwardly about a horizontal transverse hinge 19. A back 20 of a pilot seat is turned forwardly about a horizontal transverse hinge 21 so as to assume a horizontal position on the frame 51. During this first folding step the wings 2 which are composed of a plurality of telescopable wing parts are folded by displacement of the telescopable wing parts in a horizontal transverse inward direction toward the fuselage boom 1.

Figure 8:
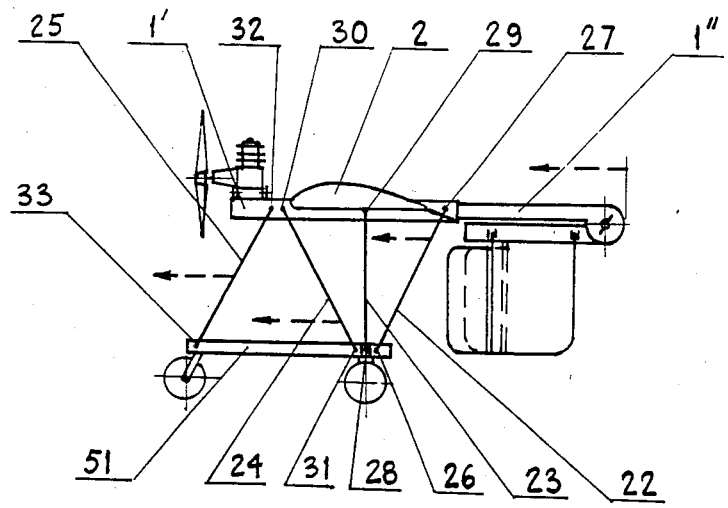
FIGS. 8 and 9 are a side view and a front view of step 2 of the folding process.
Figure 9:
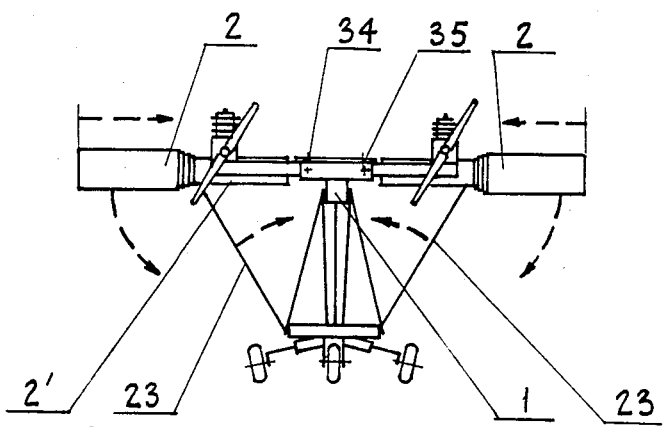

During a second step (FIGS. 8,9) of folding of the aircraft, the fuselage boom 1 which is composed of at least two telescopable parts 1' and 1" is folded by displacing the part 1" inwardly into the part 1'. The pilot compartment forming means include upright members 22,23,24 and 25 connecting the frame 51 with the fuselage boom 1 and particularly with its part 1'. The member 22 is connected with the fuselage boom and the frame by horizontal transverse hinges 26 and 27. The member 23 is connected by a horizontal transverse hinge 28 with the frame and by releasable means 29, for example, a pin and a hook, with the wing 2. The member 24 is connected by a horizontal transverse hinge 30 with the fuselage boom and by a releasable means 31, for example a pin and a hook with the frame 51. Finally, the member 25 is connected with the fuselage boom and the frame by horizontal transverse hinges 32 and 33.

During the above mentioned second folding step the members 23 are disconnected from the wings 2 in its upper point, while the member 24 is disconnected from the frame in its lower point. These two members, as well as the members 22 and 25 together with the folded fuselage boom 1 are moved forwardly, so that a parallelogram formed originally by the fuselage boom 1, the members 22 and 25, and the frame 51 assumes a shape of a rectangle. During the second folding step, the folded wings are turned downwardly about their horizontal longitudinal hinges 34 and 35. Before this, as can be seen from FIG. 9, the folded telescopable parts are moved horizontally inwardly onto the wing parts 2 directly connected with the fuselage boom.

Figure 10:
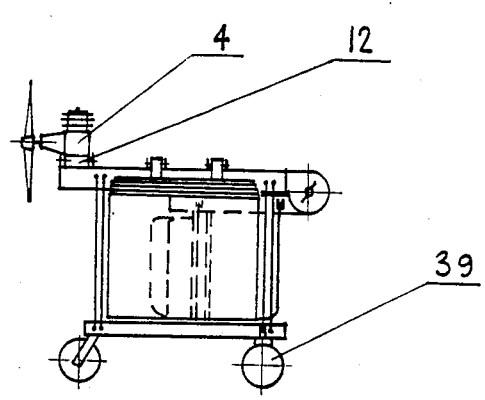
FIGS. 10 and 11 are a side view and a front view of step 3 of the folding process.
Figure 11:
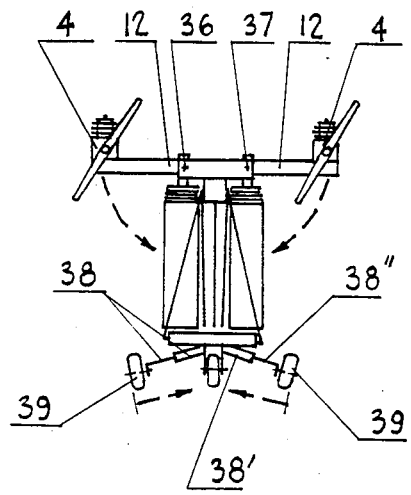

During a third folding step (FIGS. 10,11) the consoles 12 of the engines 4 are turned downwardly about their horizontal longitudinal hinges 36 and 37. Shafts 38 of side wheels 39 are telescopable as well. During the third folding step the shafts 38 are folded by displacing of their outer shaft parts 38' into their inner shaft parts 38".

Figure 12:
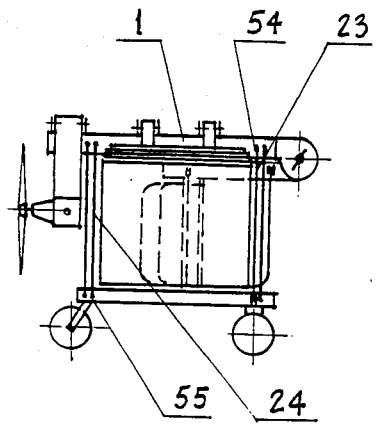
FIGS. 12 and 13 are views showing a side view and a front view of step 4 of the folding process.
Figure 13:
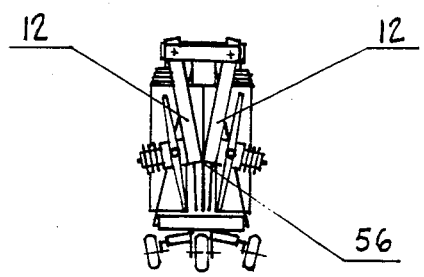
Figure 16:
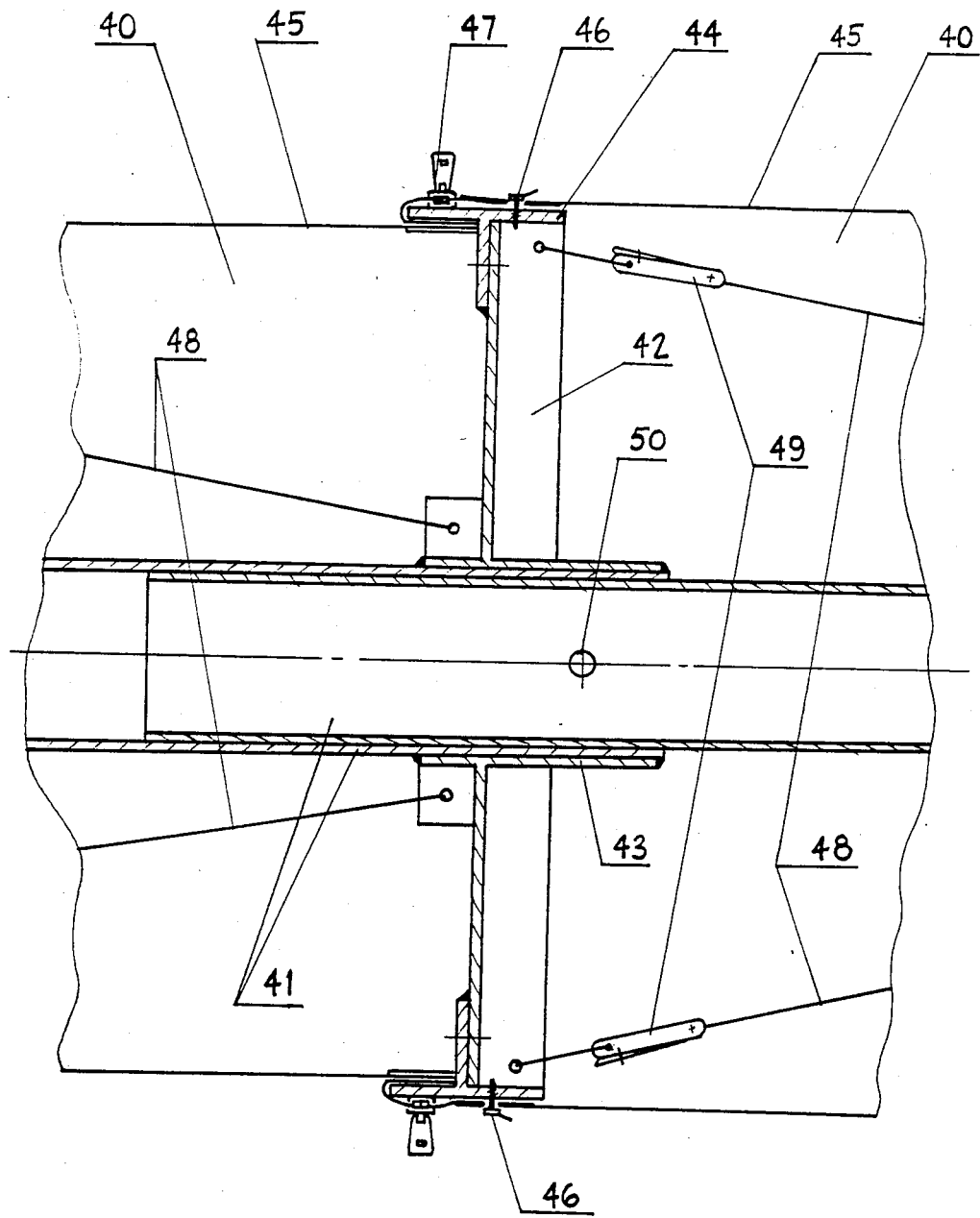
FIG. 16 is a view showing detail A of FIG. 15 on an enlarged scale.
Figure 17:
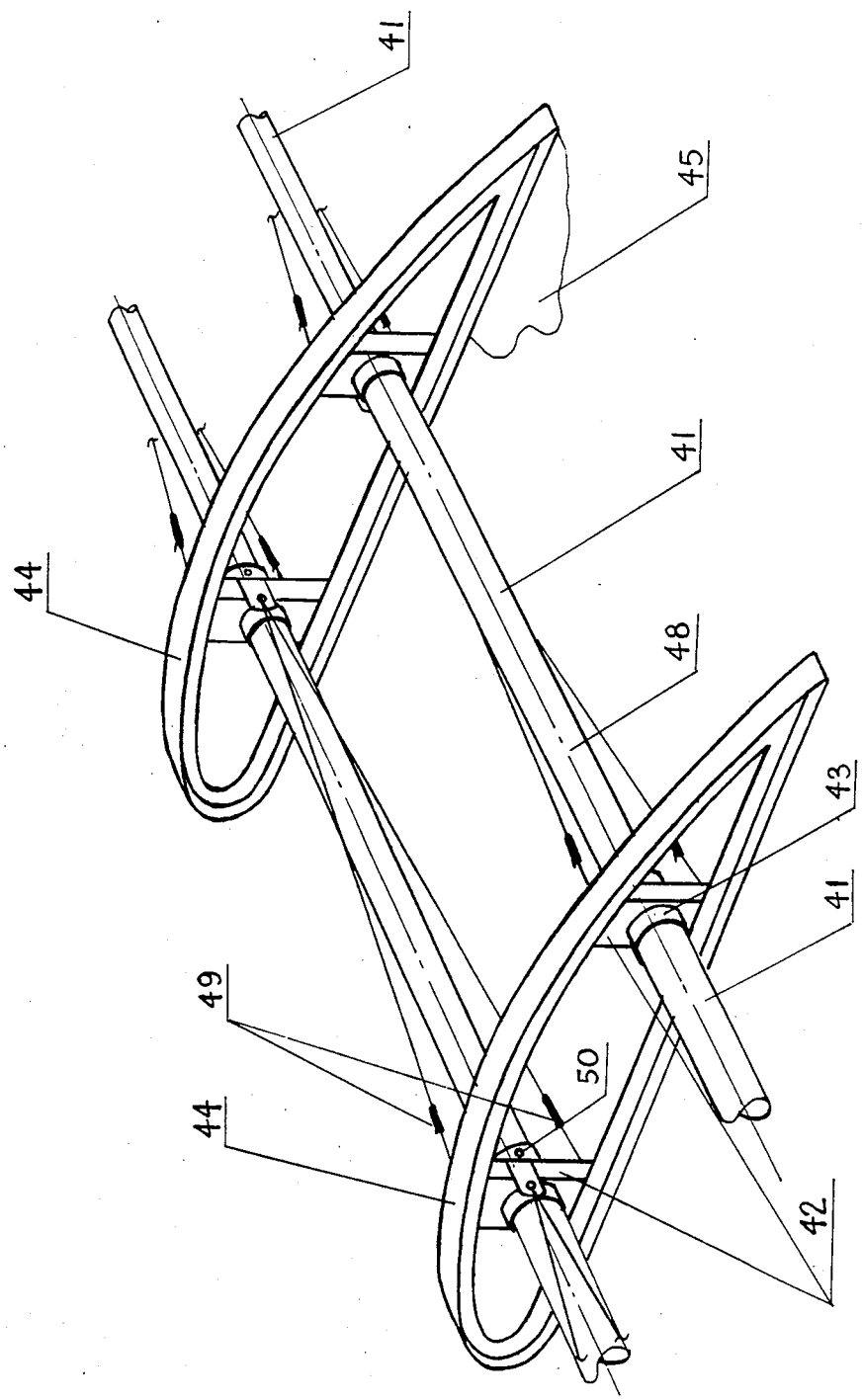
FIG. 17 is a perspective view of a wing frame part of the inventive aircraft.

During a fourth final step (FIGS. 12,13) the removed upper end of the member 23 and the removed lower end of the member 24 are fixedly connected with the fuselage boom 1 in their new positions 54 and 55. The engine consoles 12 are fixedly connected at a point 56 in folded position. The folding of the aircraft is finished. Unfolding of the inventive aircraft is performed in a reversed order.

The wings 2 are composed of telescopable wing parts 40. Each wing part has a structural tube 41, transverse member 42 forming a channel and having an inner sleeve 43, and nervure 44 together forming a frame. The frame is coated by a flexible cover 45, for example of plastic and provided with security screws 46 and zippers 47. Steel truss cables 48 with cable tension latches 49 connect the wing parts with one another. The proximate ends of the wing parts are connected with one another by a bolt or spring-loaded latch 50.

For folding the wing, the zippers 47 are opened and the security screws 46 are removed thus releasing the covers 45 of the neighboring parts from one another. The cable tension latches are released, the bolts 50 are removed, and the wing parts are moved into one another in a telescopable manner so as to assume the position of FIG. 9. Unfolding of the wings is performed in a reversed order and they assume the position shown in FIG. 15.

Figure 18:
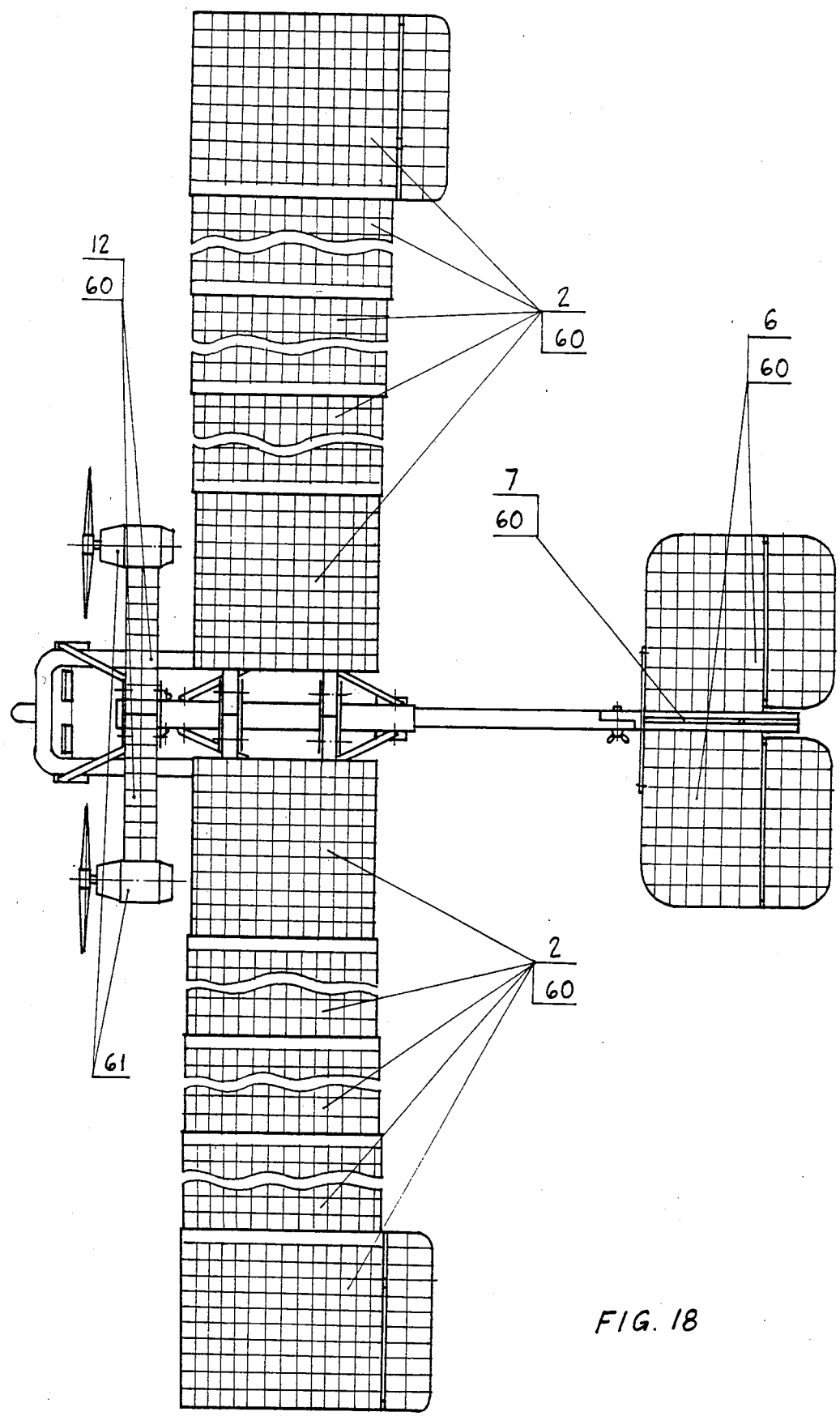
FIG. 18 is a plan view of a solar powered aircraft in accordance with the present invention.

As can be seen from FIG. 18, the wings 2, the engine consoles 12 and the fin 7 with the stabilizers 6 of the tail part can be coated by solar arrays 60, converting solar energy into electrical energy, which can be utilized by electric motors 61. The solar arrays on the wings can be formed or arranged so that they are flexible. The solar arrays make possible to convert the inventive aircraft into a solar powered aircraft. Electrical connections and electric motors control system, are of conventional design, old in the art, and well known in arrangement and methods of operation to those skilled in the art, so these aspects are omitted in present description.

The invention is not limited to the details shown since various modifications and structural changes are possible without departing in any way from the spirit of the present invention.

What is desired to be protected by Letters Patent is set forth in particular in the appended claims.

I claim:

1. An aircraft geometrically transformable pilot compartment consisting of a lower floor frame, an upper frame containing a part of a fuselage boom and a plurality of connecting members which pivotally connect said lower floor frame and said upper frame; said connecting members form two groups (left and right) located respectively on left and right sides from longitudinal center axis of said part of a fuselage boom; each of said groups include front and rear said connecting members; said lower floor frame, said upper frame and said two groups of said connecting members form together left and right parallelogram structural contours of said pilot compartment; and further said lower floor frame and said upper frame can be moved relative to one another in longitudinal direction transforming said parallelogram stuctural contours into rectangles.

2. A geometrically transformable pilot compartment as defined in claim 1, comprises at least one intermediate member added to each of said two groups of said connecting members and located between said front and rear connecting members; said intermediate member having one end pivotally and undetachably connected to said upper frame in proximity to said front connecting member and another end detachably connected to said lower floor frame in proximity to said rear connecting member and forms a diagonal connection in said parallelogram structural contours.

3. An aircraft, comprising means forming a geometrically transformable pilot compartment, a fuselage boom, wings connected with said fuselage boom, a tail part; at least one of said fuselage boom, wings and tail part being undetachably movable between an unfolded position in which it is ready for flying, and a folded position in which it is accommodated in said pilot compartment; and said wings are composed of a plurality of telescopable wing parts comprising covers and internal frames; said covers are telescopically connected in a such cross-section dimensional progression which is inverse to cross-section dimensional progression of connected telescopable elements of said internal frames; so in connection of any two adjacent said telescopable wing parts said cover of the first said telescopable wing part encloses said cover of the second said telescopable wing part, and said telescopable element of said internal frame of the first said telescopable wing part is enclosed by said telescopable element of said internal frame of the second said telescopable wing part.

4. An aircraft foldable wing comprising a plurality of wing parts having flexible telescopable cover and internal telescopable frame which includes a nervure fixedly supporting one end of said flexible telescopable cover and at least one telescopable element rigidly connected to said nervure and equipped with releasable latching means securing telescopically connected said internal telescopable frames of said wing parts in unfolded position, and another end of said flexible telescopable cover can be detachably connected to said nervure of another ajacent said wing part by detachable connecting means, and truss cables with tension latches are undetachably connected to said internal telescopable frames reinforcing structure of said wing when it is in unfolded position; and further said detachable connecting means comprise a trailing edge connector and a wing part cover connector both having detachable connecting flexible margins with cooperating locking elements, said trailing edge connector fastens a portion of the trailing edge of said flexible telescopable cover, and said wing part cover connector secured by releasable redundant fasteners connects said flexible telescopable covers of adjacent said wing parts; and further said wing part cover connector has one said detachable connecting flexible margin permanently attached to the end of said flexible telescopable cover of one adjacent wing part and another said detachable connecting flexible margin is permanently attached to said nervure of said internal telescopable frame of another adjacent said wing part, and said releasable redundant fasteners secure said wing part cover connector in locked position holding it on laterally said nevure.

5. An aircraft foldable wing as defined in claim 4, wherein said flexible telescopable covers of said wing parts are equipped with solar arrays connected electrically, converting solar energy into electrical energy.

* * * * *